US012586213B2

(12) United States Patent
Mori

(10) Patent No.: US 12,586,213 B2
(45) Date of Patent: Mar. 24, 2026

(54) METHOD AND SYSTEM FOR SUPPORTING MOVEMENT OF MOBILE OBJECT

(71) Applicant: TOYOTA JIDOSHA KABUSHIKI KAISHA, Toyota (JP)

(72) Inventor: Yuta Mori, Urayasu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 252 days.

(21) Appl. No.: 18/387,176

(22) Filed: Nov. 6, 2023

(65) Prior Publication Data

US 2024/0221183 A1     Jul. 4, 2024

(30) Foreign Application Priority Data

Jan. 4, 2023     (JP) ................................. 2023-000151

(51) Int. Cl.
*G06V 20/52*          (2022.01)
*E01F 9/559*          (2016.01)
*G06T 7/215*          (2017.01)

(52) U.S. Cl.
CPC .............. *G06T 7/215* (2017.01); *E01F 9/559* (2016.02); *G06V 20/52* (2022.01); *G06T 2207/30232* (2013.01); *G06T 2207/30241* (2013.01)

(58) Field of Classification Search
CPC ........... G06T 7/215; G06T 2207/30232; G06T 2207/30241; G06T 2207/30204; G06T 2207/30236; G06T 7/246; E01F 9/559; G06V 20/52; G06V 20/54
See application file for complete search history.

(56) References Cited

U.S. PATENT DOCUMENTS 9,959,754 B1 * 5/2018 King .................... G08G 1/0133

FOREIGN PATENT DOCUMENTS

| JP | 2005-182256 A | | 7/2005 | |
| JP | 2019-060088 A | | 4/2019 | |
| JP | 2020-87203 A | | 6/2020 | |
| JP | 2020087203 A | * | 6/2020 | |
| WO | WO-2019240062 A1 | * | 12/2019 | ............. G08G 1/005 |

* cited by examiner

*Primary Examiner* — Matthew C Bella
*Assistant Examiner* — Andrew B. Jones
(74) *Attorney, Agent, or Firm* — Oliff PLC

(57)          ABSTRACT

A mobile object included in an image of an infrastructure camera is recognized. A supporting display for supporting a movement of a mobile object is output from a pavement lighting device based on the recognition information. When the recognition information includes recognition information of first and second mobile objects, a relative speed of the second mobile object in a movement direction of the first mobile object and a distance between these mobile objects are calculated based on the recognition information. When the relative speed is equal to or greater than a predetermined speed and the distance is equal to or less than a predetermined distance, proximity notification information for notifying the first mobile object of the approach of the second mobile object is generated. When the proximity notification information is generated, the supporting display corresponding to the proximity notification information is output from the pavement lighting device.

4 Claims, 7 Drawing Sheets

METHOD AND SYSTEM FOR SUPPORTING MOVEMENT OF MOBILE OBJECT

CROSS-REFERENCE TO RELATED APPLICATION

The present application claims priority under 35 U.S.C. § 119 to Japanese Patent Application No. 2023-000151, filed on Jan. 4, 2023, the contents of which application are incorporated herein by reference in their entirety.

FIELD

The present disclosure relates to a method and a system for supporting a movement of a mobile object such as a walker.

BACKGROUND

JP2019-60088A discloses a road tack system comprising a light emitting device and a controller for controlling the light emitting device. In this related art, the light emitting device is installed at a center of an intersection, and a plurality of LEDs are arranged on a surface thereof. When a vehicle is detected around the intersection, the controller controls the light emitting device to turn on the LED arranged in a direction in which the vehicle is detected. The controller also controls the light emitting device so that a lighting interval of the LED is shortened when the detected vehicle approaches the intersection. According to such control of the light emitting device, it is possible to make a walker around the intersection aware of presence of the vehicle approaching the intersection.

In addition to JP2019-60088A, JP2005-182256A can be exemplified as documents indicating the technical level of the technical field related to the present disclosure.

Consider a situation where there are a walker moving on a road and a bicycle approaching the walker from behind the walker. In this situation, the walker recognizes the approach of the bicycle by, for example, a running sound of the bicycle or a horn of the bicycle. In a nighttime, the walker recognizes the approach of the bicycle by the road surface illuminated by a headlight of the bicycle. That is, the bicycle approaching the walker is recognized by visual or/and auditory information of the walker.

However, if the walker is wearing a sound reproduction device such as a headphone, earphones or the like, the auditory information may be blocked. Further, an irradiation range of the bicycle headlight is not so wide. Therefore, there may be a case where the walker does not notice the road surface illuminated by the bicycle headlight. Therefore, in a situation where a mobile object such as a bicycle approaches a walker, there is room for improvement or development of a technique for ensuring traffic safety of the walker without relying on a warning device included in the mobile object.

An object of the present disclosure is to provide a technique for ensuring traffic safety of a mobile object such as a walker moving on a road.

SUMMARY

A first aspect of the present disclosure is a method for supporting movement of a mobile object, and has the following features.

The method comprises the steps of: recognizing a mobile object included in an image of an infrastructure camera; and outputting a supporting display for supporting movement of the mobile object from a pavement lighting device based on recognition information of the mobile object.

The method further comprises the steps of: when the recognition information of the mobile object includes recognition information of first and second mobile objects, calculating a relative speed of the second mobile object in a movement direction of the first mobile object and a distance between the mobile objects according to the recognition information of the first and second mobile objects; and when the relative speed is greater than or equal to a predetermined speed and the distance is less than or equal to a predetermined distance, generating proximity notification information for notifying the first mobile object of approach of the second mobile object.

When the proximity notification information is generated, a supporting display corresponding to the proximity notification information is output from the pavement lighting device in the step of outputting of the supporting display.

A second aspect of the present disclosure is a system for supporting movement of a mobile object, and has the following features.

The system comprises a pavement lighting device, an infrastructure camera, and a processor. The pavement lighting device is configured to light a road surface. The infrastructure camera is configured to acquire an image of the road surface. The processor is configured to execute various types of processing.

The processor is configured to execute processing to: recognize a mobile object included in an image of the infrastructure camera; and output a supporting display for supporting movement of the mobile object to the pavement lighting device based on recognition information of the mobile object.

The processor is further configured to execute processing to: when the recognition information of the mobile object includes recognition information of first and second mobile objects, calculate a relative speed of the second mobile object in a movement direction of the first mobile object and a distance between these mobile objects based on the recognition information of the first and second mobile objects; and when the relative speed is greater than or equal to a predetermined speed and the distance is less than or equal to a predetermined distance, generate proximity notification information for notifying the first mobile object of an approach of the second mobile object.

When the proximity notification information is generated, a supporting display corresponding to the proximity notification information is output from the pavement lighting device in the processing to output the supporting display to the pavement lighting device.

According to the present disclosure, based on recognition information of a mobile object included in an image of an infrastructure camera, a supporting display for supporting movement of the mobile object is output from a pavement lighting device. In addition, when the recognition information includes that of the first and second mobile objects as the support target, the relative speed of the second mobile object in the movement direction of the first mobile object and the distance between these mobile objects are calculated based on the recognition information of these mobile objects. When the relative speed is equal to or greater than the predetermined speed and the distance is equal to or less than the predetermined distance, the proximity notification information for notifying the first mobile object of the approach of the second mobile object is generated and output from the pavement lighting device. Therefore, it is possible to make the first mobile object aware that the second mobile object is approaching the first mobile object. Therefore, it is possible to ensure a traffic safety of the first mobile object.

DESCRIPTION OF EMBODIMENT

Figure 1:
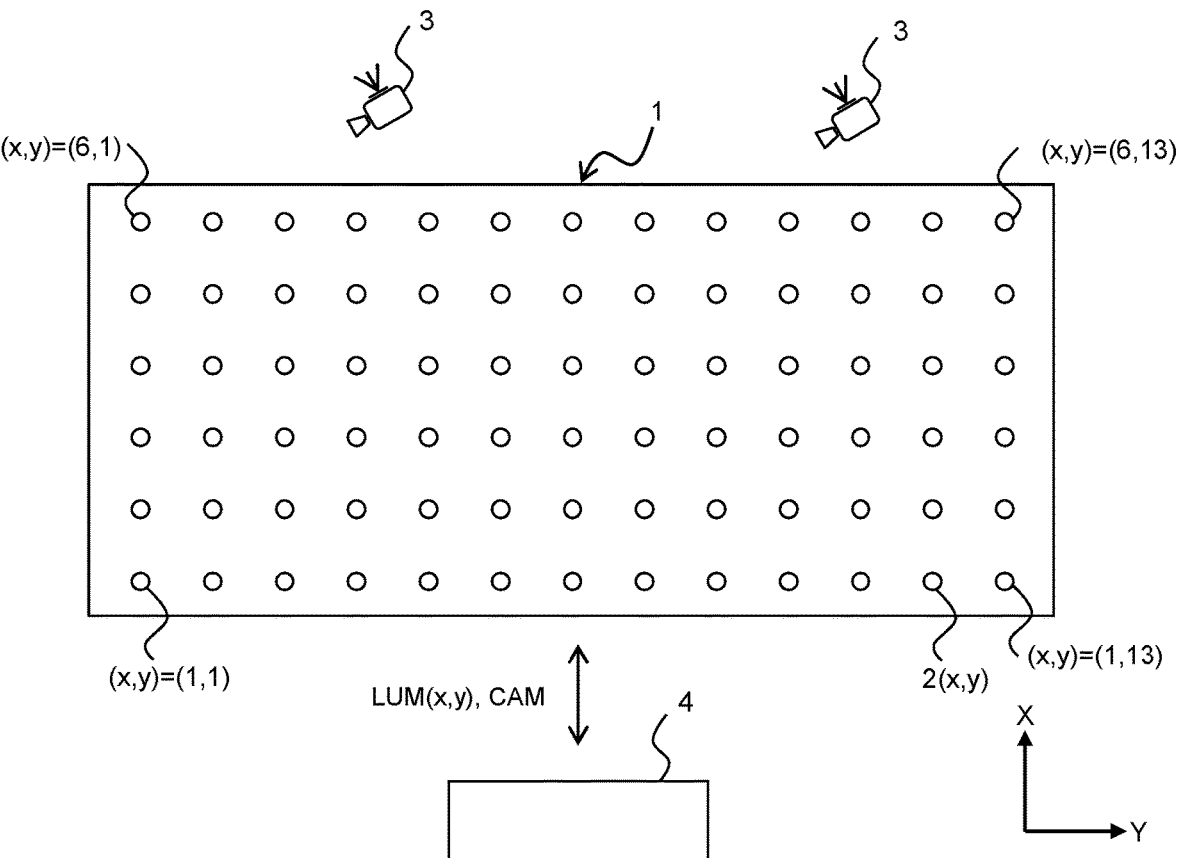
FIG. 1 is a diagram illustrating an outline of an embodiment.

Hereinafter, an embodiment of the present disclosure will be described with reference to the drawings. In the drawings, the same or corresponding parts are denoted by the same reference numerals, and the description thereof will be simplified or omitted.

1. Outline of Embodiment

FIG. 1 is a diagram illustrating an outline of an embodiment. In FIG. 1, a road 1 is depicted. Examples of the road 1 include a road on which walkers pass, and a road for mobile objects that move at a lower speed than vehicles, such as wheelchairs, self-propelled robots, bicycles, in addition to walkers. The shape and width of the road 1 are not particularly limited.

A plurality of LED markers 2 is installed on a road surface of road 1. In the example shown in FIG. 1, these LED markers 2 are equally spaced. However, an arrangement of these LED markers 2 is not limited to this example. The number of these LED markers 2 arranged per unit area is also not particularly limited. Each LED marker 2 brightens a periphery of a position where it is provided, and corresponds to an example of a "pavement lighting device" of the present disclosure. Other examples of the pavement lighting device include a device that illuminates a road surface of a road 1 with light to brighten an illumination range, a device that projects an image on a road surface of a road 1 to brighten a projection range, and the like.

Hereinafter, for convenience of description, when referring to a specific one of the plurality of LED markers 2 shown in FIG. 1, it will be described as "LED marker 2 (x, y)" using a coordinate (x, y). For example, the lower left LED marker 2 (x, y) is described as LED marker 2 (1, 1) and the upper left LED marker 2 (x, y) is described as LED marker 2 (6, 1). Also, the lower left LED marker 2 (x, y) is described as LED marker 2 (1,13), and the upper left LED marker 2 (x, y) is described as LED marker 2 (6,13).

A plurality of infrastructure cameras 3 are provided around the road 1. Each of the infrastructure cameras 3 is a camera installed in a construction around the road 1 (e.g., a facility construction such as a roof, a strut, a wall surface of a road construction, a parking facility, a factory, or the like). Each of the infrastructure cameras 3 also captures an image of a predetermined range set for each of the infrastructure cameras 3. The predetermined imaging range includes, for example, a road surface of the road 1. A part or all of the predetermined imaging range captured by one infrastructure camera 3 may overlap with that captured by another infrastructure camera 3.

The server 4 manages the movement support system. The server 4 communicates individually with the plurality of LED markers 2. In communication with respective LED markers 2, the server 4 transmits a support display information LUM (x, y) for supporting a movement of a mobile object to the respective LED markers 2. The support display information LUM (x, y) includes, for example, instruction information for the LED marker 2 (x, y). Examples of the instruction information include a luminescence color information and a brightness information. The LED marker 2 (x, y) emits light based on the instruction information for the LED marker 2 (x, y).

The server 4 also communicates with the plurality of infrastructure cameras 3 individually. In communication with respective infrastructure cameras 3, the server 4 receives a camera information CAM from the respective cameras 3. The camera information CAM includes, for example, an ID information of which the camera information CAM transmits and image information acquired by this infrastructure camera 3. The image information may be a moving image or a still image. When the infrastructure camera 3 executes object recognition processing (described later), information of a recognition result obtained by the object recognition processing may be included in the image information.

Figure 2:
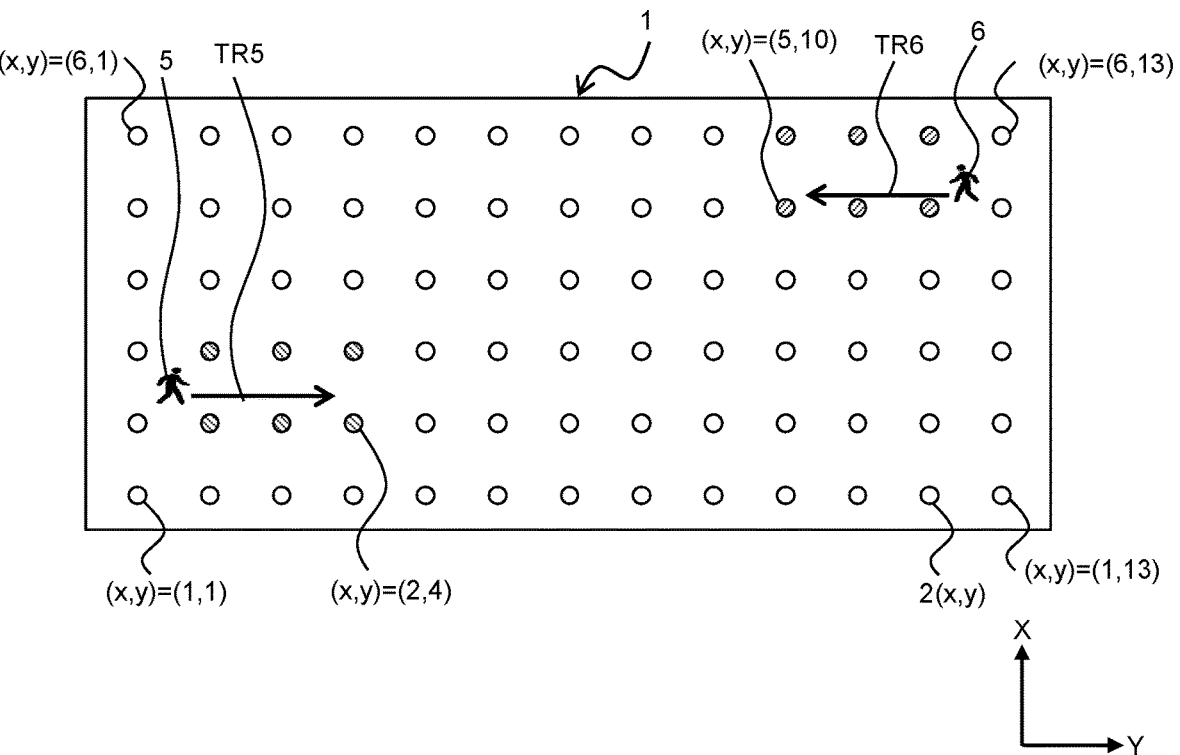
FIG. 2 is a diagram illustrating a first example of a luminescence of LED markers.

FIG. 2 is a diagram illustrating a first example of a luminescence of the LED marker 2 (x, y). In FIG. 2, mobile objects 5 and 6 (walkers) moving on the road 1 are depicted. The mobile objects 5 and 6 are recognized based on the image acquired by the infrastructure camera 3. The trajectory TR5 is a future trajectory of the mobile object 5 predicted by the recognition information of the mobile object 5. The trajectory TR6 is the future trajectory of the mobile object 6 predicted by the recognition information of the mobile object 6. Each length of the trajectory TR5 and the TR6 corresponds to a distance by which each of the mobile objects 5 and 6 is predicted to move several seconds (e.g., two to four seconds) from the current time. Each length is calculated, for example, based on moving speed and a movement direction of the mobile objects 5 and 6, respectively.

In the example shown in FIG. 2, before the trajectory TR5 and TR6 are predicted, the LED markers 2 (x, y) around the mobile objects 5 and 6 emit light with the same color and the same level of brightness. When the trajectory TR5 is predicted, the LED markers 2 (x, y) (i.e., (x, y)=(2,2) to (2,4) and (3,2) to (3,4)) located around the trajectory TR5 emit light with a specific color and a high level of brightness. The specific color may be the same as or different from the color before the prediction of the trajectory TR5. However, the brightness level of the specific color is set to a level higher than that before the prediction of the trajectory TR5. Consider a case where the brightness level is represented by five stages and the brightness level before the prediction of the trajectory TR5 is "level 1 to level 2". In this case, the brightness level of the specific color is set to "level 3 to 4".

When the trajectory TR6 is predicted, the LED marker 2 (x, y) (i.e., (x, y)=(5,10) to (5,12) and (6,10) to (6,12)) located around the trajectory TR6 emit light with a specific color and a high level of brightness. The specific color may be the same as or different from the color before the prediction of the trajectory TR6. However, the specific color is set to a color different from that of the LED marker 2 located around the trajectory TR5. The brightness level of the specific color is set to a level higher than the brightness level before the prediction of the trajectory TR6.

Figure 3:
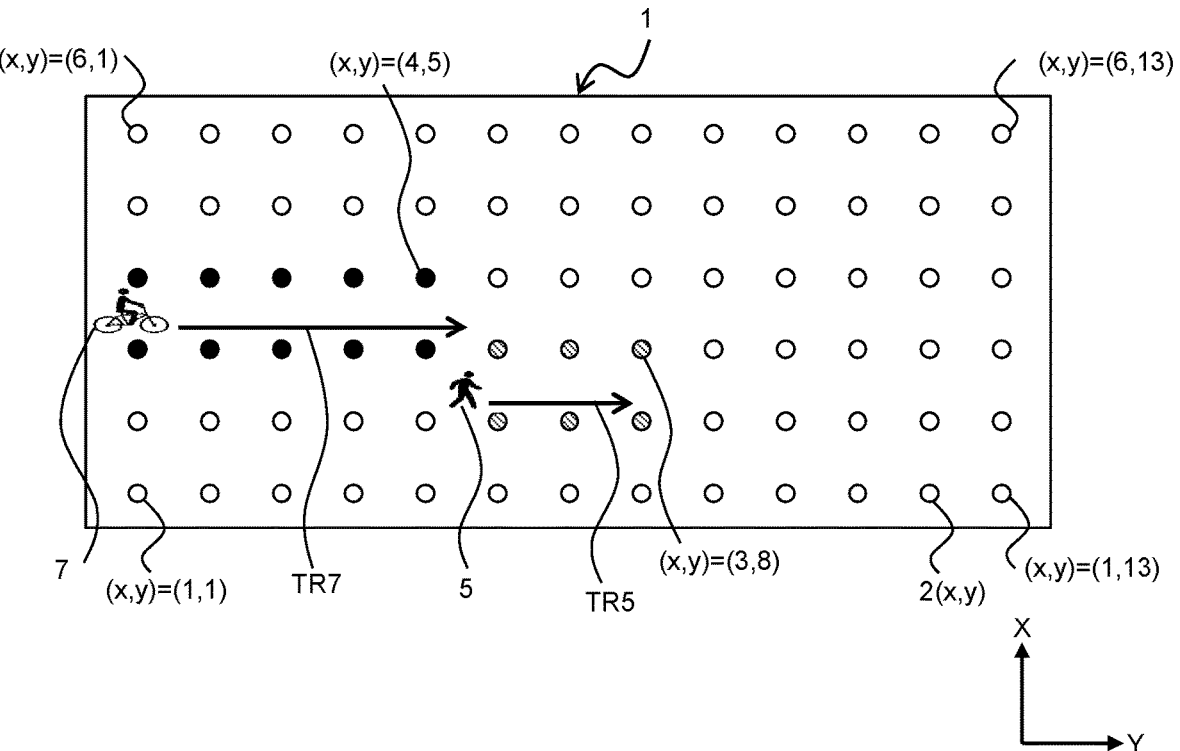
FIG. 3 is a diagram illustrating a second example of the luminescence of the LED markers.

FIG. 3 is a diagram illustrating a second example of a luminescence of the LED marker 2 (x, y). The example shown in FIG. 3 is that at a time slightly later than the time of the example shown in FIG. 2, and the mobile object 5 is depicted here. FIG. 3 also depict a mobile object 7 (a bicycle). As in the example shown in FIG. 2, the mobile object 5 is recognized based on the image acquired by the infrastructure camera 3. Like the mobile object 5, the mobile object 7 is also recognized based on the image acquired by the infrastructure camera 3. The trajectory TR7 is a future trajectory of the mobile object 7 predicted by the recognition information of the mobile object 7. The reason why the trajectory TR7 is longer than the TR5 is that the moving speed of the mobile object 7 is higher than that of the mobile object 5.

In the example shown in FIG. 3, the LED markers 2 (x, y) (i.e., (x, y)=(2,6) to (2,8) and (3,6) to (3,8)) located around the trajectory TR5 emit light with a specific color and a high level of brightness. This specific color is the same color as the specific color of the LED marker 2 located around the trajectory TR5 described in FIG. 2. The brightness level of this specific color is the same brightness level as the specific color of the LED marker 2 located around the trajectory TR5 described in FIG. 2.

In the example shown in FIG. 3, with the prediction of the trajectory TR7, the LED markers 2 (x, y) (i.e., (x, y)=(3, 1) to (3, 5) and (4, 1) to (4, 5)) located around the trajectory TR7 emit light in a specific color and at a high level of brightness. The specific color may be the same as or different from the color before the prediction of the trajectory TR7. However, the specific color is set to a color different from that of the LED marker 2 located around the trajectory TR5.

As shown in FIGS. 2 and 3, in the embodiment, when a mobile object is recognized in an image acquired by the infrastructure camera 3, a future trajectory of the mobile object is predicted. Then, the LED marker 2 (x, y) located around the future trajectory is caused to emit light in a specific color and at a high level of brightness. In the case of using a device for irradiating the road surface of the road 1 with light, it is conceivable to irradiate the road surface with strip-shaped light extending along the future trajectory. When a device for projecting an image on a road surface of a road 1 is used, it is conceivable to project an image of an arbitrary shape corresponding to a future trajectory on the road surface.

Consider a situation where a plurality of mobile objects come and go on the road 1. In this case, it is considered that the light emission of the LED markers 2 (x, y) described in FIGS. 2 and 3 are useful for avoiding a collision (including an undesirable approach considering a traffic safety, the same applies hereinafter) of these mobile objects. This is because, when the LED markers 2 (x, y) located around respective future trajectories of these mobile objects emit light, the approach of another mobile object can be recognized. However, in the example shown in FIG. 3, the mobile object 7 approaches the mobile object 5 from behind the mobile object 5. Therefore, it is difficult for the mobile object 5 to notice the light emission of the LED markers 2 (x, y) located around the trajectory TR7.

Thus, in this embodiment, if a plurality of mobile objects is recognized, it is determined whether any two mobile objects selected from these mobile objects are approaching. This determination is made based on a distance DS between the two mobile objects and relative speed RS of these mobile objects.

For convenience of description, any two mobile objects are referred to as a "mobile object MA" and a "mobile object MB". The distance DS is calculated based on a position of the mobile object MA and that of the mobile object MB. The relative speed RS is calculated based on, for example, speed of the mobile object MA in a movement direction of the mobile object MA and the speed of the mobile object MB in this direction. When the sign of the relative speed is positive, it means that the mobile object MB is approaching the mobile object MA. On the other hand, when the sign of the relative speed is negative, it means that the mobile object MB is moving away from the mobile object MA.

In the embodiment, when the distance DS is equal to or less than a predetermined distance THD and the relative speed RS is equal to or greater than a predetermined speed THS, it is determined that the mobile object MB is approaching the mobile object MA. The predetermined distance THD and the predetermined speed THS may be fixed values, or may vary depending on the speed of the mobile object MA or the mobile object MB. For example, the predetermined distance THD may be set to a longer value as the speed of the mobile object MB is higher. Further, the predetermined speed THS may be set to a higher value as the speed of the mobile object MB is higher. The predetermined distance THD and the predetermined speed THS may vary depending on a density of the plurality of mobile objects present in the road 1. For example, as the density increases, the predetermined distance THD may be set to a shorter value. Alternatively, the predetermined speed THS may be set to a lower value as the density increases.

Figure 4:
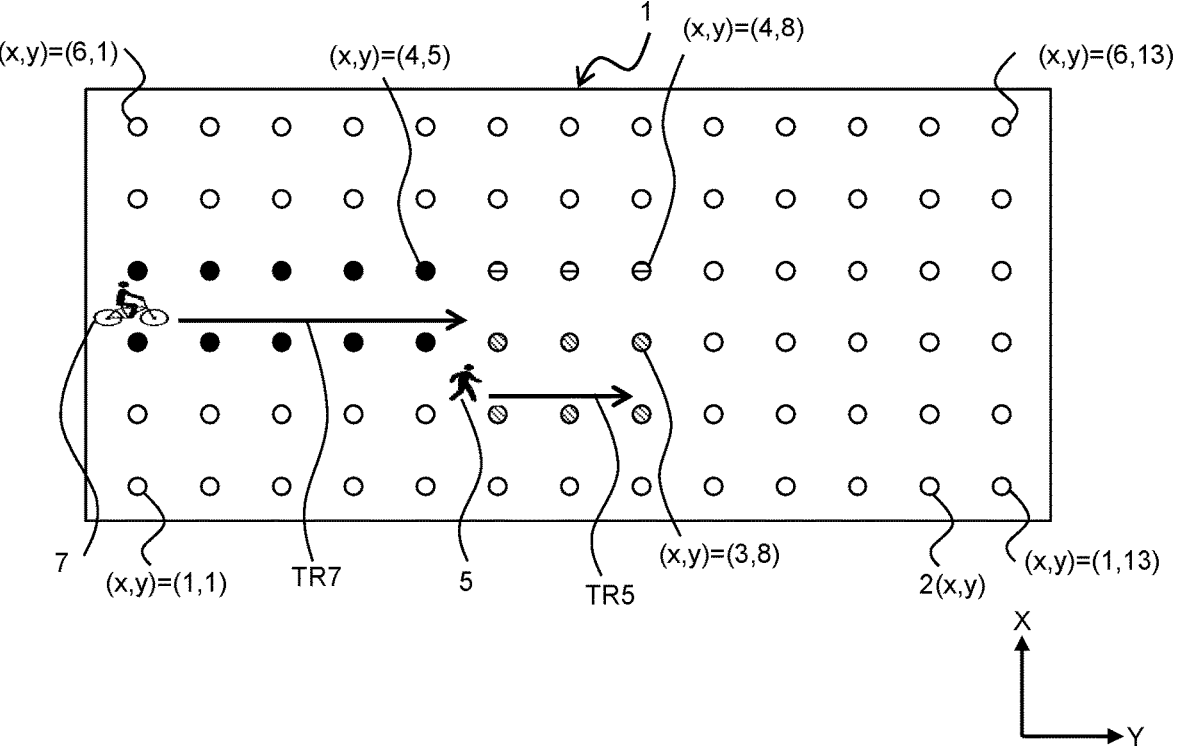
FIG. 4 is a diagram illustrating a countermeasure example when mobile objects are recognized and two arbitrary mobile objects selected from the recognized mobile objects are close to each other.

An example of measures taken when it is determined that the mobile object MB is approaching the mobile object MA will be described with reference to FIG. 4. In FIG. 4, the mobile object 5 (a walker) and the mobile object 7 (a bicycle) are depicted. Also the trajectory TR5 and the trajectory TR7 are depicted in FIG. 4. In the example shown in FIG. 4, the LED markers 2 (x, y) located around the trajectory TR5 and the LED markers 2 (x, y) located around the trajectory TR7 emit light. Up to this point, it is the same as the example described in FIG. 3.

In the example shown in FIG. 4, it is assumed that it is determined that mobile object 7 is approaching the mobile object 5. In this case, in the embodiment, a "proximity notification information" for notifying the mobile object 5 of the approach of the mobile object 7 is generated. The proximity notification information is information for causing a specific LED marker 2 (x, y) to emit light in a specific color and at a high level of brightness. In the example shown in FIG. 4, the LED markers 2 (x, y) (e.g., (x, y)=(4, 6) to (4, 8)) located next to the LED markers 2 (x, y) emitting light along the trajectory TR5 emit light.

The LED markers 2 (x, y) emitting light based on the proximity notification information are located leftward (a reference of the direction is the movement direction of the mobile object 5) of the LED markers 2 (x, y) emitting light along the trajectory TR5. By causing the LED markers 2 (x, y) at such a position to emit light, a relative position of the mobile object 7 with respect to the movement direction of the mobile object 5 can be informed to the mobile object 5. The color (i.e., the specific color) of the LED markers 2 (x, y) that emit light based on the proximity notification information are set to a color different from that of the LED markers 2 that emit light along the trajectory TR5. The brightness level of the specific color is set to the same brightness level as the specific color of the LED markers 2 that emit light along the trajectory TR5 described in FIG. 2.

As described above, according to the embodiment, when it is determined that the mobile object MB approaches the mobile object MA, it is possible to make the mobile object MA aware of the approach of the mobile object MB by the LED marker 2 (x, y) which emits light based on the proximity notification information. In addition, by setting the color of the LED marker 2 (x, y) which emits light based on the proximity notification information to the color different from that of the LED marker 2 which emits light along the trajectory TR of the mobile object MA, it is possible to make the mobile object MA easily notice the approach of the mobile object MB. Therefore, it is possible to ensure traffic safety of the mobile object MA. Hereinafter, the embodiment will be described in more detail.

2. Movement Support System

2-1. System Configuration Example

Figure 5:
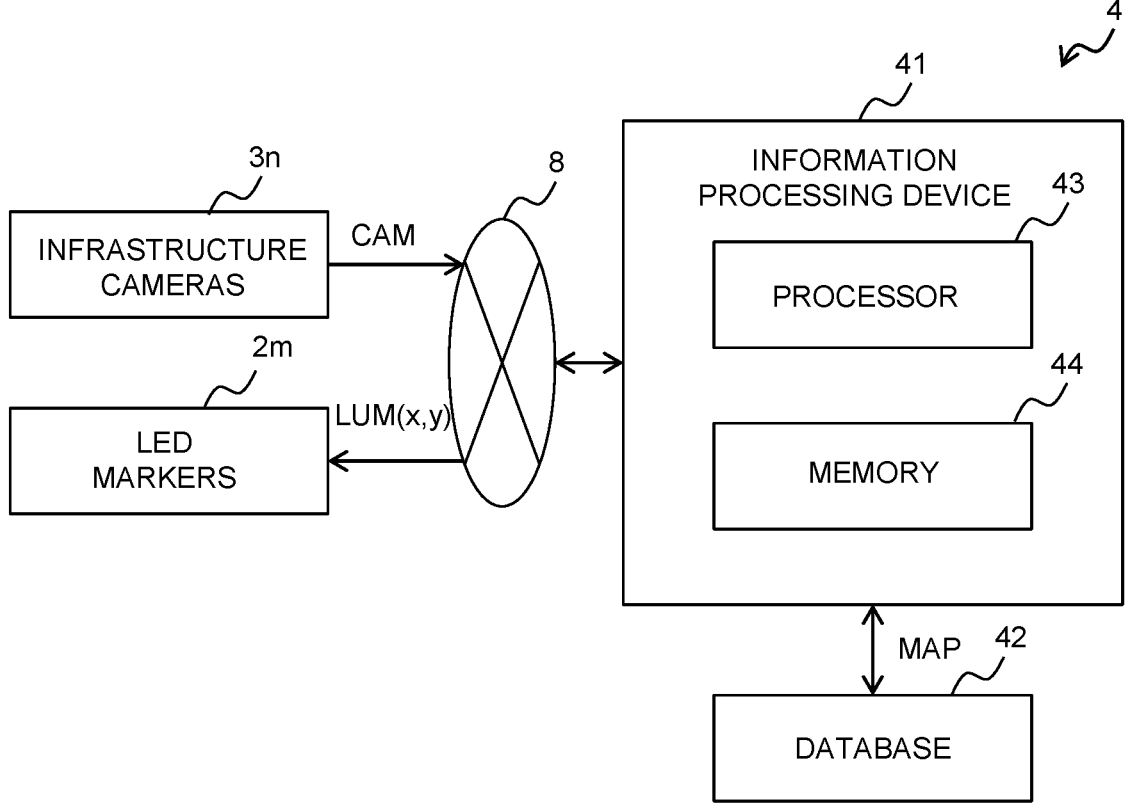
FIG. 5 is a diagram illustrating a configuration example of a movement support system according to the embodiment.

FIG. 5 is a diagram illustrating a configuration example of a movement support system according to the embodiment. In the example shown in FIG. 5, the movement support system includes LED markers 2$m$, infrastructure cameras 3$n$, and a server 4. The LED markers 2$m$ and the infrastructure cameras 3$n$ communicate with the server 4 via a communication network 8. The communication network 8 is not particularly limited, and a wired or wireless network is used.

The LED markers 2$m$ includes m units of LED markers 2 (m≥1). Installation locations of the m units of the LED markers 2 are known. Each of the LED markers 2 operates in accordance with a support display information LUM (x, y) received from the server 4, and brightens surroundings of a position where the marker is provided. The support display information LUM (x, y) includes, for example, an instruction information for the LED marker 2 (x, y). Examples of the instruction information include the luminescence color information and the brightness information. The luminescence color information is information indicating a color emitted by a light source of the LED marker 2 (x, y) such as purple, blue, green, yellow, orange, or red. The brightness information is information indicating a level of brightness of the light source of the LED marker 2 (x, y).

The infrastructure cameras 3$n$ include n units of the infrastructure cameras 3 (n≥1). Installation locations of the n units of the infrastructure cameras 3 are known. Each of the infrastructure cameras 3 captures an image of a predetermined range set for each of the infrastructure cameras 3. The predetermined imaging range is also known. Each infrastructure camera 3 transmits a camera information CAM to the server 4. The camera information CAM includes, for example, ID information of the infrastructure camera 3 that has transmitted the camera information CAM and image information acquired by the infrastructure camera 3.

The server 4 includes an information processing device 41 and a database 42. The information processing device 41 includes at least one processor 43 and at least one memory 44. The processor 43 includes a central processing unit (CPU). The memory 44 is a volatile memory such as a DDR memory, and loads various programs used in various processes performed by the processor 43 and temporarily stores various information. The various information used by processor 43 includes the camera information CAM and the map information MAP stored in database 12.

The database 42 is formed in a predetermined memory device (e.g., a hard disk or a flash memory). The map information MAP is stored in the database 42. The map information MAP includes data relating to specifications (e.g., a type, a size, a latitude, a longitude, and a height of a central position or one or more representative positions) of artificial objects such as buildings, roads, and railways, and data relating to specifications of natural objects such as rivers, lakes, and marshes. The map information MAP also includes information on the installation positions of the LED markers 2$m$ and the infrastructure cameras 3$n$. The map information MAP further includes specifications of respective infrastructure cameras 3 included in the infrastructure cameras 3$n$. The data related to the specifications of the respective infrastructure cameras 3 includes angle of view information (i.e., information on the predetermined imaging range) of each infrastructure camera.

2-2. Processing Example Executed by Server

Figure 6:
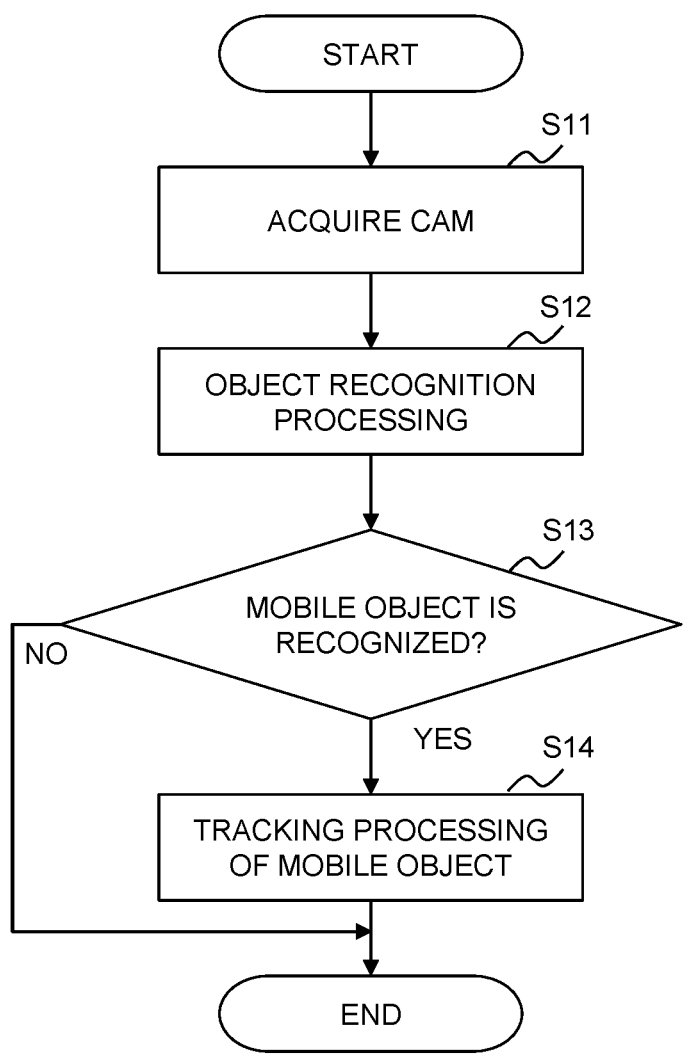
FIG. 6 is a flowchart illustrating processing flow executed by a server and particularly relevant to the embodiment.
Figure 7:
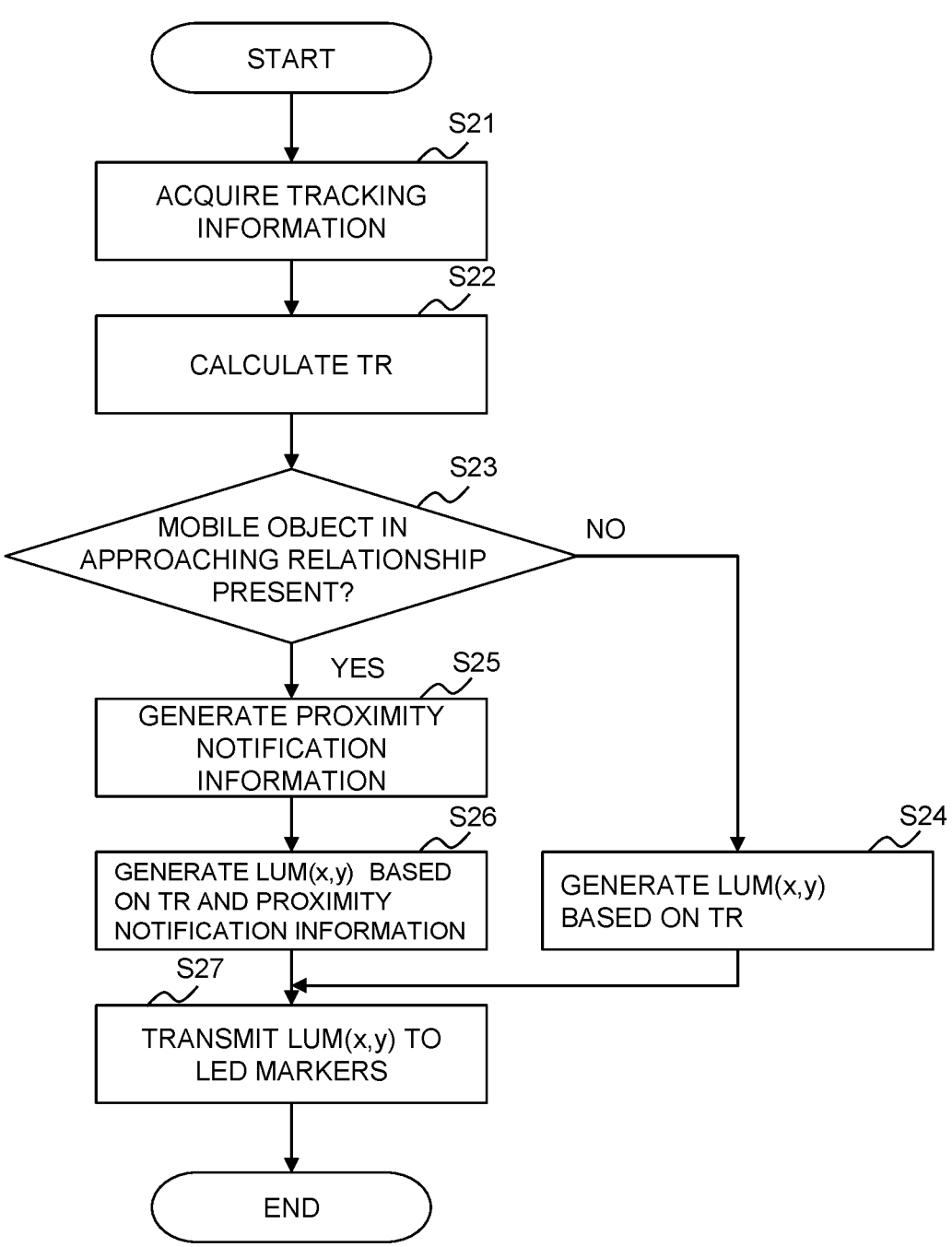
FIG. 7 is a flowchart illustrating processing flow executed by the server and particularly relevant to an embodiment.

FIGS. 6 and 7 are flowcharts illustrating the flow of processing executed by the server 4 (the processor 43) and particularly related to the embodiment. The processing routine shown in FIGS. 6 and 7 is repeatedly executed at a predetermined cycle.

In the processing routine shown in FIG. 6, first, the camera information CAM is acquired (step S11). As described above, the camera information CAM includes the ID information of the infrastructure camera 3 that has transmitted the camera information CAM and the image information acquired by the infrastructure camera 3. The image information may include information on a time at which the image information is acquired.

Following the processing of step S11, the object recognition processing is executed (step S12). In the object recognition processing, a mobile object included in the image of the infrastructure camera 3 is recognized. A method of recognizing the mobile object is not particularly limited, and a known method can be applied. An example of the known method is an object recognition method using a machine learning model. When a mobile object is recognized by the object recognition processing, identification information is assigned to the recognized mobile object. Examples of the identification information include number information assigned to each mobile object, type information of the recognized mobile object (e.g., walker, wheelchair, self-propelled robot, bicycle, etc.), and feature quantity information of the recognized mobile object.

Following the processing of step S12, it is determined whether the mobile object is recognized (step S13). When the identification information is generated in the processing of step S12, the determination result of step S13 is positive. If the determination result in step S13 is positive, the mobile object is tracked (step S14). The tracking processing of the mobile object is not particularly limited, and a known method is applicable. As a known method, a method to perform an association with a mobile object recognized in a plurality of frames based on the feature quantity information of the mobile object (Re-identification method) is exemplified.

By executing the tracing processing, the moving speed and the movement direction of the mobile object recognized in the processing of step S12 are calculated. For the mobile object for which the moving speed and the movement direction are calculated, the tracking information is generated. The tracking information is stored in the memory 44 in combination with the identification information of the mobile object, for example.

In the processing routine shown in FIG. 7, the tracking information is first acquired (step S21). The tracking information is generated for each mobile object. Therefore, in the processing of step S21, tracking information of all mobile objects existing in the road 1 is acquired.

Following the processing of step S21, the trajectory TR is calculated (step S22). The calculation of the trajectory TR is performed for each mobile object based on the tracking information (the moving speed and the movement direction) acquired in the processing of step S21. The length of the trajectory TR corresponds to a distance by which the mobile object is predicted to move several seconds (e.g., two to four seconds) from the current time.

Following the processing of step S22, it is determined whether there is a mobile object in an approaching relationship (step S23). For example, when only one trajectory TR is generated in the processing of step S22, the determination result of step S23 is negative. On the other hand, when two or more trajectory TRs are generated in the processing of step S22, the determination result of step S23 may be positive. That is, when the distance DS between two mobile objects corresponding to arbitrary two trajectory TRs selected from two or more trajectory TRs is equal to or less than the predetermined distance THD and the relative speed RS between the two mobile objects is equal to or greater than the predetermined speed THS, the determination result in step S23 is positive. When the determination result of step S23 is negative, the processing of step S24 is executed. On the other hand, when the determination result is positive, the process of step S25 is executed.

In the processing of step S24, the support display information LUM (x, y) is generated based on at least one trajectory TR generated in the processing of step S22. The support display information LUM (x, y) includes, for example, the instruction information for the LED marker 2 (x, y). Examples of the instruction information include the luminescence color information and the brightness information. When two or more trajectory TRs are generated in the processing of step S22, the luminescence color information is generated such that the luminescence color of the LED markers 2 (x, y) located around a certain trajectory TR is different from that of the LED markers 2 (x, y) located around another trajectory TR.

It is desirable that the color assigned as the emission color of the LED markers 2 (x, y) located around a certain trajectory TR is not changed and continues to be assigned until the mobile object corresponding to the trajectory TR is not recognized in the road 1. Therefore, when the luminescence color information is generated, it is desirable that colors such as purple, blue, green, yellow, orange, and red are sequentially assigned to the individual trajectory TRs in accordance with the order in which the mobile object is recognized in the road 1.

The brightness level included in the brightness information is higher than the brightness level of the LED markers 2 (x, y) that is not located around the trajectory TR. Here, the brightness level of the LED markers 2 (x, y) that is not located around the trajectory TR is set in accordance with the illuminance around the road surface of the road 1, for example. For example, consider a case where the brightness level is represented by five levels and the illuminance around the road surface in the road 1 is low (e.g., at night). In this case, the brightness level of the LED markers 2 (x, y) that is not located around the trajectory TR is set to "level 2 to 3". On the other hand, when a streetlamp provided on the road 1 is turned on even at night, the brightness level is set to "level 1 to 2".

In the processing of step S25, the proximity notification information is generated. The proximity notification information is generated as information for one mobile object (i.e., the mobile object MA) which is approached by the other mobile object included in the two mobile objects (i.e., the mobile objects MA and MB) determined to be in the approaching relationship in the processing of step S23. The proximity notification information is information for causing the LED markers 2 (x, y) located next to the LED markers 2 (x, y) that emit light along the trajectory TR of the approaching mobile object to emit light in the specific color and at the high level of brightness.

The LED markers 2 (x, y) located next to the LED markers 2 (x, y) emitting light along the trajectory TR of the mobile object is, for example, the LED markers 2 (x, y) located in at least one of leftward and rightward with respect to the movement direction of the mobile object. When a relative position (leftward or rightward) of the approaching mobile object (e.g., the mobile object MB) is known, the LED markers 2 (x, y) may be only the LED marker 2 (x, y) on the relative position side. When the approaching mobile object is located right behind the approaching mobile object, the LED markers 2 (x, y) may be the LED markers 2 (x, y) located leftward and rightward. The LED markers 2 (x, y) located on the front or rear side with respect to the movement direction of the mobile object may be combined with the LED markers 2 (x, y) located leftward or rightward to indicate an accurate relative position (e.g., left front, right rear) of the approaching mobile object.

Following the processing of step S25, the support display information LUM (x, y) is generated (step S26). The support display information LUM (x, y) generated in the processing of step S26 is based on the trajectory TRs of the two mobile objects determined to be in the proximity relationship in the processing of step S23. The support display information LUM (x, y) generated in the processing of step S26 is also for the LED marker 2 (x, y) specified by the proximity notification information generated in the processing of step S25.

Following the processing of step S24 or S26, the support display information LUM (x, y) is transmitted to respective LED markers 2 (step S27). The respective LED markers 2 (x, y) that has received the support display information LUM (x, y) emits light based on the instruction information included in this information.

What is claimed is:

1. A method for supporting movement of a mobile object, the method comprising the steps of:

recognizing a mobile object included in an image of an infrastructure camera; and outputting a supporting display for supporting movement of the mobile object from a pavement lighting device based on recognition information of the mobile object, when the recognition information of the mobile object includes recognition information of first and second mobile objects, calculating a relative speed of the second mobile object in a movement direction of the first mobile object and a distance between the mobile objects according to the recognition information of the first and second mobile objects; and when the relative speed is greater than or equal to a predetermined speed and the distance is less than or equal to a predetermined distance, generating proximity notification information for notifying the first mobile object of approach of the second mobile object, wherein:

when the proximity notification information is generated, a supporting display corresponding to the proximity notification information is output from the pavement lighting device in the step of outputting of the supporting display;

the pavement lighting device includes a plurality of LED markers installed on a road surface of a road;

in the step of outputting of the supporting display, the supporting display for supporting the movement of the mobile object is output by a light emission of the plurality of LED markers arranged along a future trajectory of the mobile object predicted using the recognition information of the mobile object;

when the proximity notification information is generated, the supporting display corresponding to the proximity notification information is performed by a light emission of the plurality of LED markers located adjacent to the plurality of LED markers emitting light along the future trajectory of the first mobile object; and a light emission color of the plurality of LED markers emitting light along the future trajectory of the first mobile object is different from that of the plurality of LED markers emitting light based on the supporting display corresponding to the proximity notification information.

2. A system for supporting movement of a mobile object, comprising:

a pavement lighting device configured to light a road surface of the road;

an infrastructure camera configured to acquire an image of the road surface; and a processor configured to execute various types of processing, wherein:

the processor is configured to execute processing to:

recognize a mobile object included in an image of the infrastructure camera;

output a supporting display for supporting movement of the mobile object to the pavement lighting device based on recognition information of the mobile object;

when the recognition information of the mobile object includes recognition information of first and second mobile objects, calculate a relative speed of the second mobile object in a movement direction of the first mobile object and a distance between these mobile objects based on the recognition information of the first and second mobile objects; and when the relative speed is greater than or equal to a predetermined speed and the distance is less than or equal to a predetermined distance, generate proximity notification information for notifying the first mobile object of an approach of the second mobile object;

when the proximity notification information is generated, a supporting display corresponding to the proximity notification information is output from the pavement lighting device in the processing to output the supporting display to the pavement lighting device;

the pavement lighting device includes a plurality of LED markers installed on the road surface of the road;

the processor is further configured to predict a future trajectory of the mobile object using the recognition information of the mobile object;

in the step of causing the pavement lighting device to output the supporting display, the outputting of the supporting display for supporting the movement of the mobile object is performed by a light emission of the plurality of LED markers located around the future trajectory of the mobile object;

when the proximity notification information is generated, the supporting display corresponding to the proximity notification information is performed by a light emission of the plurality of LED markers located adjacent to the plurality of LED markers emitting light along the future trajectory of the first mobile object; and the light emission color of the plurality of LED markers emitting light along the future trajectory of the first mobile object is different from that of the plurality of LED markers emitting light based on the supporting display corresponding to the proximity notification information.

3. The method according to claim 1, wherein:

the plurality of LED markers is installed on the road surface of the road in a grid pattern with each LED marker of the plurality of LED markers equally spaced from an adjacent LED marker of the plurality of LED markers; and when the proximity notification information is generated, the supporting display corresponding to the proximity notification information is performed by the light emission of the plurality of LED markers at a first color located adjacent to the plurality of LED markers emitting light at a second color different than the first color along the future trajectory of the first mobile object.

4. The system according to claim 2, wherein:

the plurality of LED markers is installed on the road surface of the road in a grid pattern with each LED marker of the plurality of LED markers equally spaced from an adjacent LED marker of the plurality of LED markers; and when the proximity notification information is generated, the supporting display corresponding to the proximity notification information is performed by the light emission of the plurality of LED markers at a first color located adjacent to the plurality of LED markers emitting light at a second color different than the first color along the future trajectory of the first mobile object.

* * * * *